United States Patent
Blume

[11] Patent Number: 5,913,608
[45] Date of Patent: Jun. 22, 1999

[54] SLIDE BEARING FOR A SHAFT

[75] Inventor: Peter Blume, Zürich, Switzerland

[73] Assignee: MAAG Pump Systems Textron AG, Zurich, Switzerland

[21] Appl. No.: 08/896,088

[22] Filed: Jul. 17, 1997

[30] Foreign Application Priority Data

Jul. 17, 1996 [EP] European Pat. Off. ............... 96111487

[51] Int. Cl.[6] ............................ F16C 23/02; F16C 33/10
[52] U.S. Cl. ............................................ 384/192; 384/286
[58] Field of Search ................................... 384/192, 175, 384/125, 286, 289, 290, 397

[56] References Cited

U.S. PATENT DOCUMENTS

| | | | |
|---|---|---|---|
| 1,816,474 | 7/1931 | Eaton | 384/286 |
| 4,940,002 | 7/1990 | Bien | 384/192 X |
| 4,995,735 | 2/1991 | Dansdill | 384/192 X |
| 5,325,736 | 7/1994 | Tsujita | 384/192 X |

FOREIGN PATENT DOCUMENTS

| | | | |
|---|---|---|---|
| 107213 | 4/1927 | Austria | 384/192 |
| 1301718 | 7/1962 | France . | |
| 2215110 | 8/1974 | France . | |
| 66534 | 4/1969 | Germany . | |
| 1380947 | 1/1975 | United Kingdom . | |
| 8002447 | 11/1980 | WIPO . | |

*Primary Examiner*—Thomas R. Hannon
*Attorney, Agent, or Firm*—Evenson McKeown Edwards & Lenahan, PLLC

[57] ABSTRACT

A slide bearing has a bearing bore for accommodating a shaft acted upon at least temporarily by a radial force. At least one bearing end of the slide bearing has at least one chamfer for preventing a contact between the shaft and the slide bearing and/or for facilitating the supply of the slide bearing with lubricating medium. In a preferred embodiment, in which the radial force acts essentially in a predetermined direction onto the shaft, at least one chamfer is provided on an unstressed side created because of the predetermined force effect, which chamfer is larger than a chamfer on a stressed side situated opposite the unstressed side. By means of the chamfer or chamfers, the danger of contact on the unstressed side caused by a bending of the shaft is reduced and the supply of the slide bearing with lubricating medium is increased without significantly reducing the bearing length on the stressed side which essentially carries the bearing load.

18 Claims, 2 Drawing Sheets

SLIDE BEARING FOR A SHAFT

This application claims the priority of European application 96 111 487.3 filed in the European Patent Office on Jul. 17, 1996, the disclosure of which is expressly incorporated by reference herein.

BACKGROUND AND SUMMARY OF THE INVENTION

The present invention relates to a slide bearing having a bearing bore for receiving a shaft which is at least temporarily affected by radial force. Preferred embodiments of the present invention relate to such a slide bearing in use in a gear pump with the shaft supporting a gear pump gear wheel.

Slide bearings are used, for example, for receiving drive shafts or the like in order to fix these locally. In this case, the bearing absorbs the forces acting upon the shaft, particularly those which radially affect the shaft.

It is known that slide bearings have a play adapted to the operating conditions. This is necessary so that a suitable lubricating medium which corresponds to the selected play can penetrate into the slide bearing. In the case of lubricating media which, in addition to the pure flow properties, have an increased elastic fraction, the entering of the lubricating medium into the bearing gap may be difficult; that is, sufficient lubricating medium can arrive in the bearing gap only if additional pressure is applied. Particularly in the case of slide bearings for gear pumps, in which the pumping medium is often simultaneously used as the lubricating medium, the entering of the lubricating medium into the bearing gap is very difficult; particularly because the pumping medium usually consists of liquids of a relatively high viscosity. Although, when highly viscous lubricating media are used, the play of the shaft in the slide bearing is selected to be corresponding larger, the stressing of one bearing end is often excessively high so that, in the case of higher shaft loads—despite a sufficient carrying capacity of the slide bearing—a lack of space may occur because of an inclination of the shaft in the bearing which may result in increased friction losses and, in an extreme case, even to a wedging of the shaft.

The present invention is therefore based on the task of providing a slide bearing in the case of which the danger of a wedging of the shaft is reduced and/or in the case of which a sufficient lubrication is ensured.

This object is achieved by providing an arrangement wherein at least one bearing end of the slide bearing has at least one chamfer for preventing a contact between the shaft and the slide bearing and/or for facilitating the supplying of the slide bearing with lubricating medium.

The invention has the following advantages: In that at least one bearing end of a slide bearing is chamfered toward the bearing bore, the contact danger caused by a bending of the shaft is reduced and it is achieved that sufficient lubricant is supplied to the slide bearing. Particularly if the stressing of the slide bearing takes place by a radial stressing of the shaft disposed in the slide bearing essentially in one direction, one or preferably two chamfers in the bearing ends are found to be especially advantageous. In this case, preferably the chamfer on the unstressed side has a larger construction than that on the stressed side. As a result, the body edge is shortened on the unstressed side in its longitudinal sectional view so that the shaft-caused contact danger is reduced on the unstressed side and the supply of lubricant to the slide bearing is facilitated without a significant reduction of the bearing length essentially supporting the bearing load on the stressed side. This significantly reduces the danger of increased friction losses in the slide bearing as well as the danger of a wedging of the shaft in the slide bearing.

Other objects, advantages and novel features of the present invention will become apparent from the following detailed description of the invention when considered in conjunction with the accompanying drawings.

DETAILED DESCRIPTION OF THE DRAWINGS

Figure 1:
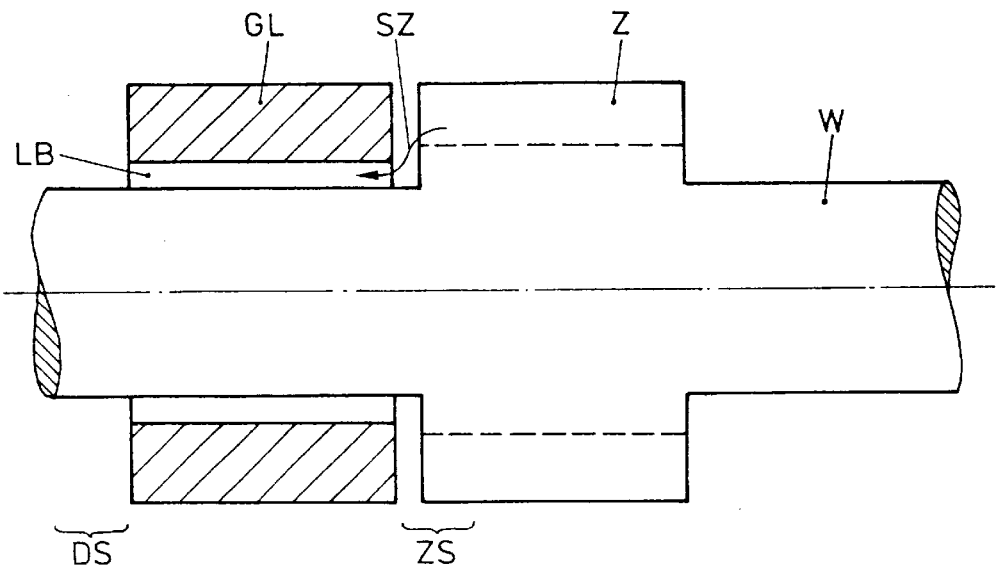
FIG. 1 is a longitudinal sectional schematic representation of a slide bearing receiving a shaft, constructed according to a preferred embodiment of the present invention.

FIG. 1 is a schematic representation of a portion of a gear pump which consists of a gear wheel Z, a shaft W and a slide bearing GL with a bore LB, the gear wheel Z being fixedly connected with the shaft W and the shaft W engaging in the bore LB of the slide bearing GL. In this case, the shaft W is slid so far into the slide bearing GL that the gear wheel Z mounted on the shaft W adjoins the slide bearing GL. For this reason, in the following, this side of the slide bearing GL is called the gear wheel side ZS. On the bearing end situated opposite the gear wheel side ZS, a seal is preferably provided (not shown in FIG. 1). Correspondingly, this side of the slide bearing GL is called the seal side DS.

Figure 2:
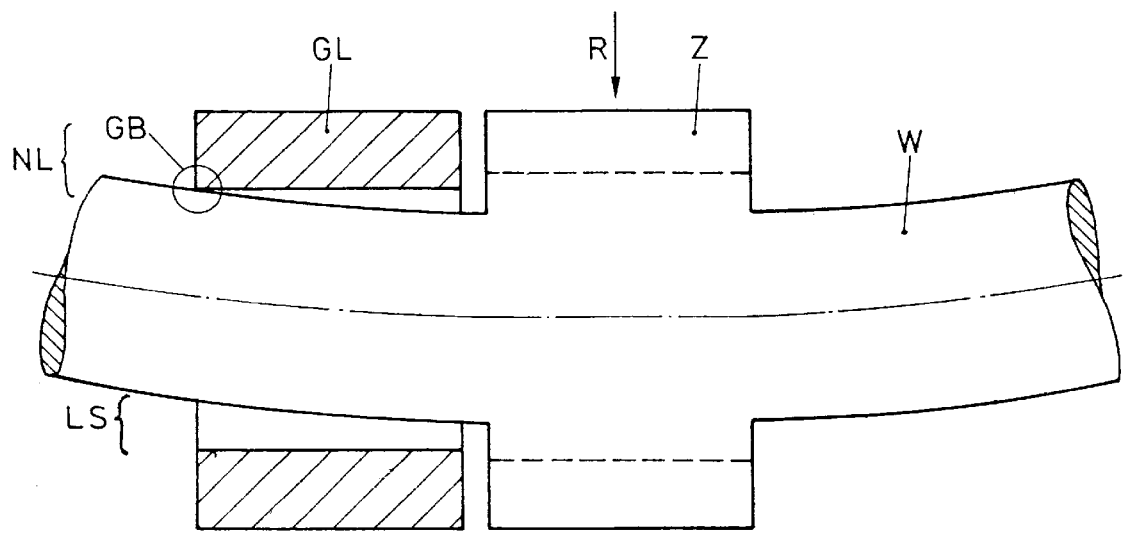
FIG. 2 is a longitudinal sectional schematic view of the arrangement according to FIG. 1 in the case of which the shaft is stressed, the bending of the shaft caused by the load being exaggerated for the purpose of a clear view.

FIG. 2 shows the arrangement according to FIG. 1, but now a radial force R acts upon the gear wheel Z which results in a corresponding bending of the shaft which is shown in FIG. 2 in a very exaggerated manner. As a result of the stationary radial force R, the shaft W is pressed essentially into a predetermined direction which results in an eccentricity of the shaft W with respect to the slide bearing GL. Because of the bending of the shaft caused by the radial force R, a stressed side LS and an unstressed side NL occur in the slide bearing GL, the term "stressed side" indicating that area of the slide bearing GL which is more stressed by the effect of the radial force R, and the term "unstressed side NL" being that area which is opposite the stressed side LS.

Particularly as a result of the exaggerated representation of the shaft bending, FIG. 2 shows clearly that first a danger area GB is created on the unstressed side NL—specifically on the seal side DS—(indicated by a circle in FIG. 2) in which a contact between the shaft W and the slide bearing GL is possible because of the effect of the radial force R onto the shaft W. A contact between these two parts leads to an increased wear; in an extreme case, even to a destruction of the shaft W or of the slide bearing GL, and must therefore be avoided. According to the invention, the slide bearing GL is provided with a chamfer, as explained in detail in the following.

Figure 3:
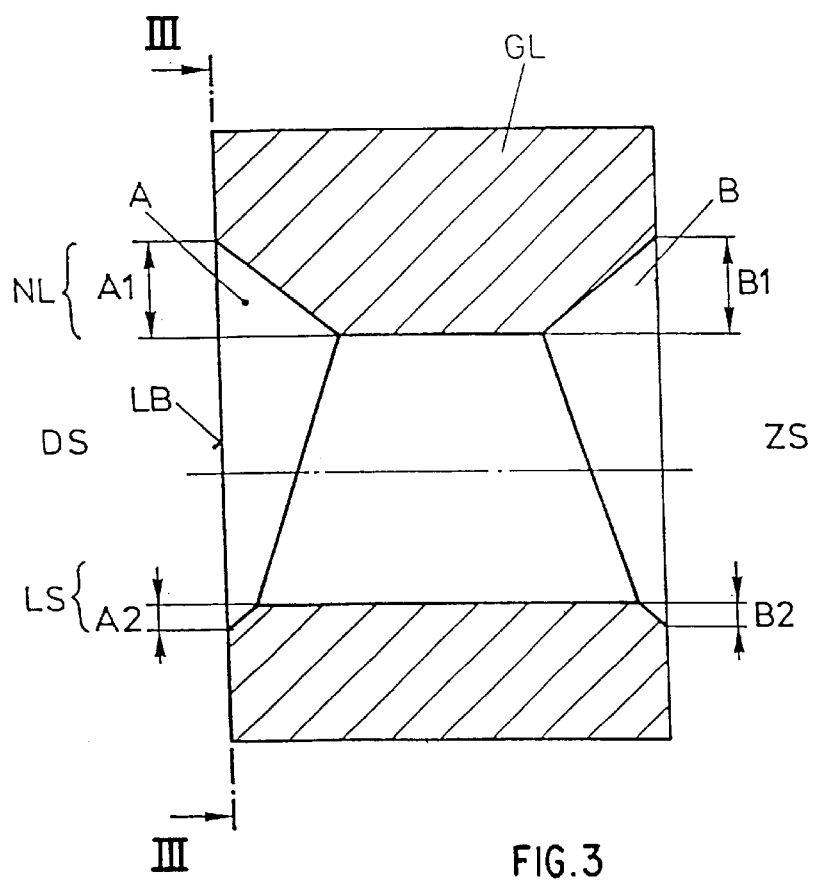
FIG. 3 is a longitudinal sectional schematic view of a slide bearing according to the invention, with the chamfer sections at the ends shown enlarged to better illustrate the invention features.

FIG. 3 illustrates a slide bearing GL according to the invention which, on the seal side DS, is constructed with an asymmetrical chamfer A which is illustrated in an exaggerated manner in FIG. 3 corresponding to the shaft bending shown in FIG. 2, the chamfer A having a larger construction on the unstressed side NL than on the stressed side LS. If this slide bearing GL according to the invention is used in the arrangement according to FIG. 2, the danger of contact between the shaft W and the slide bearing GL is significantly reduced.

In the case of a gear pump in which the pumping medium is simultaneously used as a lubricating medium which, by way of the pumping space of the gear pump, flows into the slide bearing GL (in FIG. 1, the flow direction of the lubricating medium is marked SZ), the afterflow of the lubricating medium, for space reasons in the slide bearing GL and because of pressure conditions existing in the slide bearing GL is often insufficient which may result in additionally high wear.

According to the invention, it is suggested to provide the bearing end on the gear wheel side ZS with a chamfer B. If the stressing of the shaft W and of the slide bearing GL is the result of a radial force R which acts essentially from the same direction onto the shaft W, the bearing bore LB must be chamfered such that essentially a larger chamfer B1 exists on an unstressed side NS than on the stressed side LS. As a result, the body edge on the unstressed side NS is shortened in the longitudinal sectional view so that the lubricating medium can better flow into the slide bearing GL, which improves the lubrication of the shaft W.

A preferred embodiment of the invention consists of the fact that the slide bearing GL has a chamfer on the seal side as well as on the gear wheel side, as indicated in FIG. 3 by the chamfers A and B. This ensures the lubricating medium entry to the slide bearing GL and avoids the contact between the slide bearing GL and the shaft W, without the requirement of accepting a significant shortening of the supporting bearing length.

Figure 4:
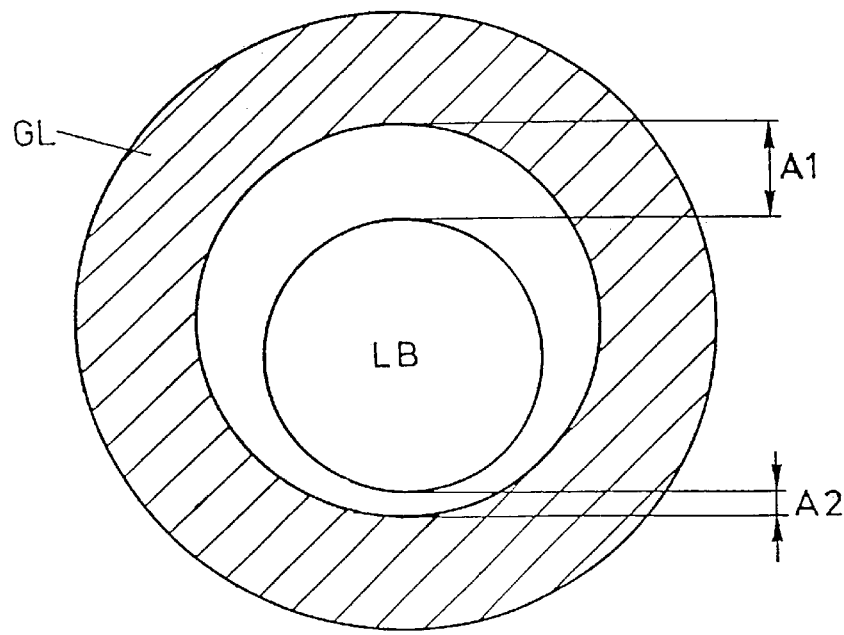
FIG. 4 is a sectional view III—III of the slide bearing according to the invention illustrated in FIG. 3.

FIG. 4 is a sectional view A—A of the slide bearing GL illustrated in FIG. 3 in the area of the seal-side bearing end. In the slide bearing GL, the bearing bore LB is visible as a concentric bore which, however, because of the chamfer A1 and A2 does not reach to the gear-wheel-side bearing end or is expanded because of the chamfer A. FIG. 4 also shows a chamfer which is continuously distributed in the circumferential direction and which changes from the largest chamfer A1 to the smallest chamfer A2.

The chamfer which is distributed continuously in the circumferential direction on the bearing end of the slide bearing GL can be obtained in that the center line of the slide bearing GL encloses an angle which differs from zero with the axis of rotation of a lathe chuck of a turning machine which fixes the slide bearing GL.

In another embodiment of the invention, it is also conceivable that the slide bearing GL is provided with a chamfer A or B only on the unstressed side NL. With respect to FIG. 4, this means that the chamfer A2 or B2 on the stressed side LS does not exist because the chamfer A or B tapers off from the chamfer A1 or B1 maximally occurring on the unstressed side NL, in the circumferential direction of the bearing bore LB before the stressed side LS is reached.

Based on the slide bearing GL according to the invention, it should be understood by a person skilled in the art that chamfers A and B or A1 and B1 or A2 and B2 may have different dimensions and do not have to be selected to have the same size.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Slide bearing having a bearing bore for receiving a shaft which is at least temporarily affected by a radial force, wherein at least one bearing end of the slide bearing has at least one chamfer for preventing a contact between the shaft and the slide bearing and/or for facilitating the supplying of the slide bearing with lubricating medium, and wherein said at least one chamfer section is asymmetric with respect to an axis of said slide bearing.

2. Slide bearing according to claim 1, wherein the whole circumference of the bearing bore of at least one bearing end has a chamfer.

3. Slide bearing according to claim 2, wherein, when the shaft is stressed by a radial force which acts essentially in a predetermined direction upon the shaft, a stressed side and an unstressed side are created in the slide bearing, the chamfer on the unstressed side having a larger construction than the chamfer on the stressed side.

4. Slide bearing according to claim 3, wherein the chamfer transitions from the largest chamfer on the unstressed side to the smallest chamfer on the stressed side have a continuous construction in the circumferential direction.

5. Slide bearing according to claim 1, wherein at least a part of the circumference of the bearing bore of at least one bearing end has no chamfer.

6. Slide bearing according to claim 1, wherein, when the shaft is stressed by a radial force which acts essentially in a predetermined direction upon the shaft, a stressed side and an unstressed side are created in the slide bearing, the chamfer on the unstressed side having a larger construction than the chamfer on the stressed side.

7. Slide bearing according to claim 6, wherein the chamfer transitions from the largest chamfer on the unstressed side to the smallest chamfer on the stressed side have a continuous construction in the circumferential direction.

8. Slide bearing according to claim 7, wherein the slide bearing accommodates a shaft supporting gear wheels of a gear pump.

9. Slide bearing according to claim 8, wherein the chamfers are provided on a gear wheel side and/or on a seal side.

10. Slide bearing according to claim 1, wherein the slide bearing accommodates a shaft supporting gear wheels of a gear pump.

11. Slide bearing according to claim 10, wherein the chamfers are provided on a gear wheel side and/or on a seal side.

12. A gear pump assembly comprising:

a gear wheel support shaft which in use supports a gear pump gear wheel, and a slide bearing rotatably supporting the support shaft, wherein at least one bearing end of the slide bearing is provided with a chamfer section facilitating operation of the slide bearing, and wherein said at least one chamfer section is asymmetric with respect to an axis of said slide bearing.

13. A gear pump assembly according to claim 12, wherein one of said chamfer sections is provided at an end of said slide bearing which faces away from the pump gear wheel on the support shaft.

14. A gear pump assembly according to claim 12, wherein, when the shaft is stressed by a radial force which acts essentially in a predetermined direction upon the shaft, a stressed side and an unstressed side are created in the slide bearing, the chamfer on the unstressed side having a larger construction than the chamfer on the stressed side.

15. A gear pump assembly according to claim 12, wherein both bearing ends of the slide bearing are provided with respective ones of said chamfer sections.

16. A gear pump assembly according to claim 15, wherein said chamfer sections at both bearing ends are asymmetric with respect to a slide bearing central axis.

17. Slide bearing having a bearing bore for receiving a shaft which is at least temporarily affected by a radial force, wherein at least one bearing end of the slide bearing has at least one chamfer for preventing a contact between the shaft and the slide bearing and/or for facilitating the supplying of the slide bearing with lubricating medium, and wherein, when the shaft is stressed by a radial force which acts essentially in a predetermined direction upon the shaft, a stressed side and an unstressed side are created in the slide bearing, the chamfer on the unstressed side having a larger construction than the chamfer on the stressed side.

18. A gear pump assembly comprising:

a gear wheel support shaft which in use supports a gear pump gear wheel, and a slide bearing rotatably supporting the support shaft, wherein at least one bearing end of the slide bearing is provided with a chamfer section facilitating operation of the slide bearing, and wherein, when the shaft is stressed by a radial force which acts essentially in a predetermined direction upon the shaft, a stressed side and an unstressed side are created in the slide bearing, the chamfer on the unstressed side having a larger construction than the chamfer on the stressed side.

* * * * *